United States Patent [19]

Lichtenberg et al.

[11] Patent Number: 4,694,706

[45] Date of Patent: Sep. 22, 1987

[54] CONTROL CABLE CONDUIT LENGTH ADJUSTMENT DEVICE

[75] Inventors: Norman B. Lichtenberg, Tecumseh; Adam W. Chaczyk, Allen Park, both of Mich.

[73] Assignee: Acco Babcock Inc., Fairfield, Conn.

[21] Appl. No.: 23,895

[22] Filed: Mar. 12, 1987

Related U.S. Application Data

[63] Continuation of Ser. No. 829,762, Feb. 14, 1986, abandoned.

[51] Int. Cl.$^4$ .............................................. F16C 1/10
[52] U.S. Cl. .................................. 74/501.5 R; 74/502; 74/501 R
[58] Field of Search ............... 74/501.5 R, 501.5 H, 74/502, 501 R, 501 A, 501 D, 503

[56] References Cited

U.S. PATENT DOCUMENTS

| | | | |
|---|---|---|---|
| 1,575,826 | 3/1926 | Goetz | 74/502 |
| 2,101,160 | 12/1937 | Weber | 74/502 |
| 2,172,294 | 9/1939 | Riddell | 74/502 |
| 2,213,322 | 9/1940 | McGregor | 74/502 |
| 2,256,697 | 9/1941 | Weber | 74/502 |
| 3,393,578 | 7/1968 | Tschanz | 74/502 |
| 3,572,159 | 3/1971 | Tschanz | 74/501.5 R |
| 3,710,645 | 1/1973 | Bennett | 74/501.5 R |
| 3,988,943 | 11/1976 | Orcutt | 74/501.5 R |
| 4,079,950 | 3/1978 | Langford | 74/502 |
| 4,177,631 | 12/1979 | Fillmore | 74/501.5 R |
| 4,185,516 | 1/1980 | Betlinski | 74/501.5 R |
| 4,334,438 | 6/1982 | Mochida | 74/501.5 R |
| 4,378,713 | 4/1983 | Haskell et al. | 74/501.5 R |
| 4,610,180 | 9/1986 | Spease | 74/501.5 R |

FOREIGN PATENT DOCUMENTS

| | | | |
|---|---|---|---|
| 3101498 | 9/1982 | Fed.Rep. of Germany | 74/501.5 R |
| 653424 | 5/1951 | United Kingdom | 74/502 |
| 2088502 | 6/1982 | United Kingdom | 74/502 |

*Primary Examiner*—Gary L. Smith
*Assistant Examiner*—Vinh Luong
*Attorney, Agent, or Firm*—Barnes, Kisselle, Raisch, Choate, Whittemore & Hulbert

[57] ABSTRACT

A control cable conduit length adjustment device comprising an outer detent member connected to a conduit, an inner adjuster member extending into the detent member, the adjuster member having opposed sets of ratcheting teeth and the detent member having opposed detent pawls with teeth engaging the teeth on the adjuster member. The teeth on the adjuster member are offset longitudinally so that a smaller increment of adjustment is provided. A control cable extends through the conduit and the detent and adjuster members. Resetting of the device is achieved by rotating the detent member relative to the adjuster member to disengage the teeth on the pawls and adjuster member so that the members can be moved longitudinally relative to one another.

6 Claims, 10 Drawing Figures

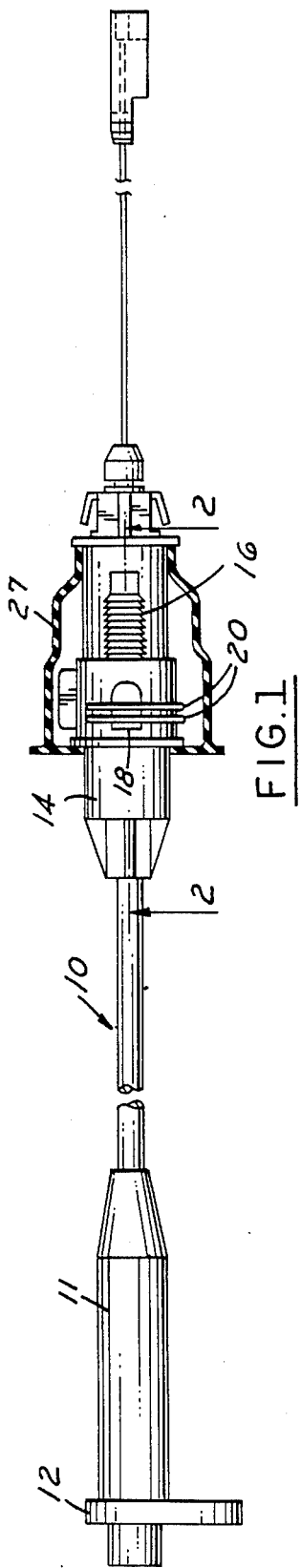
FIG.1
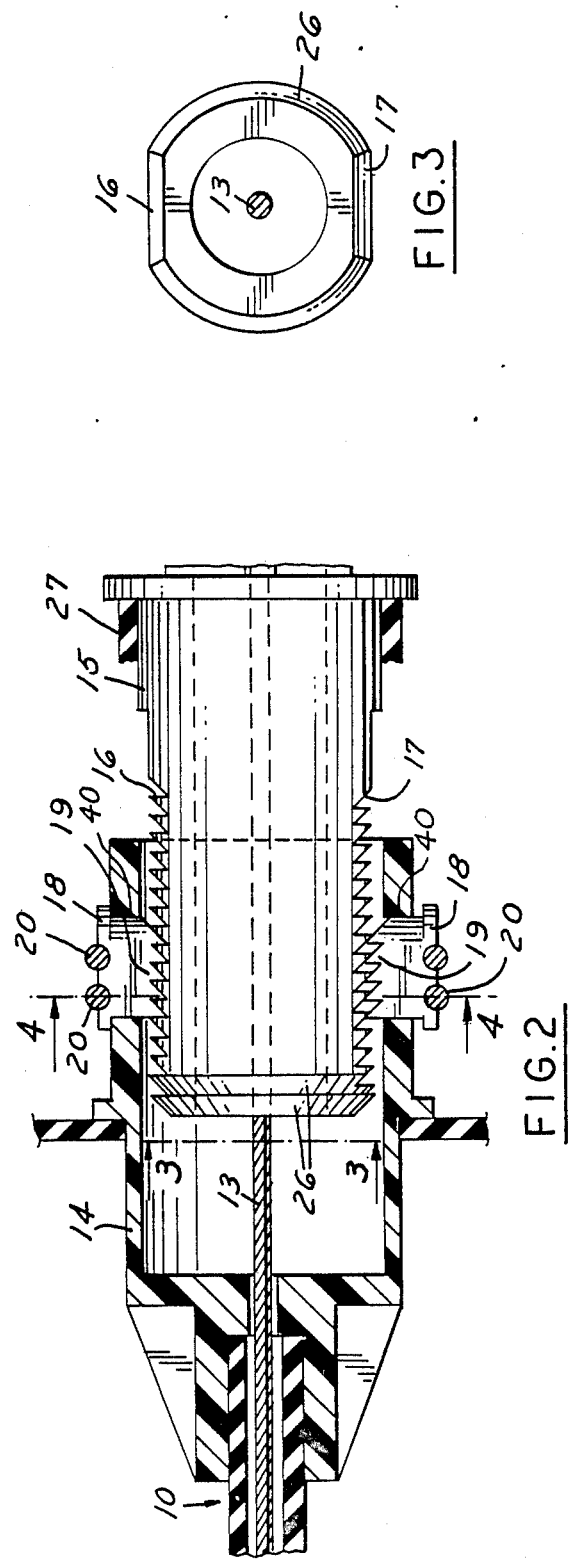
FIG.3
FIG.2

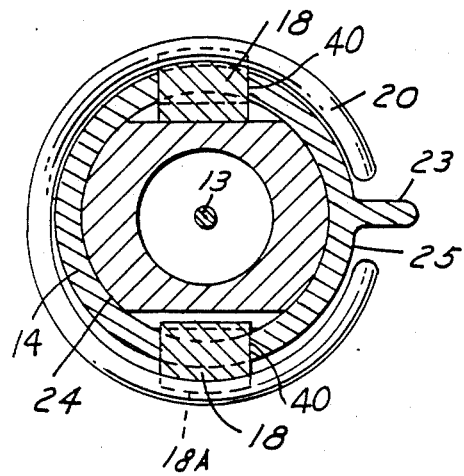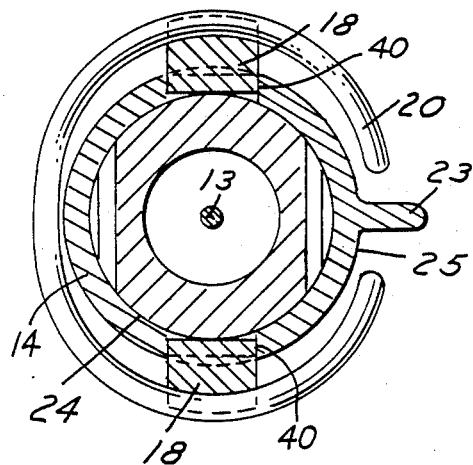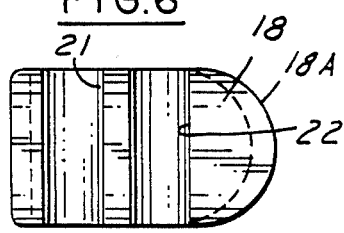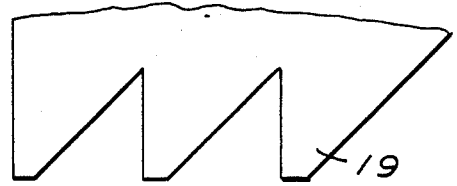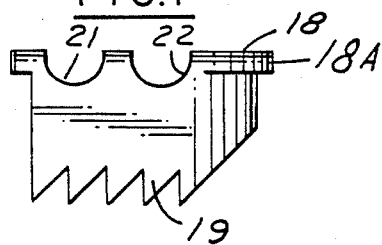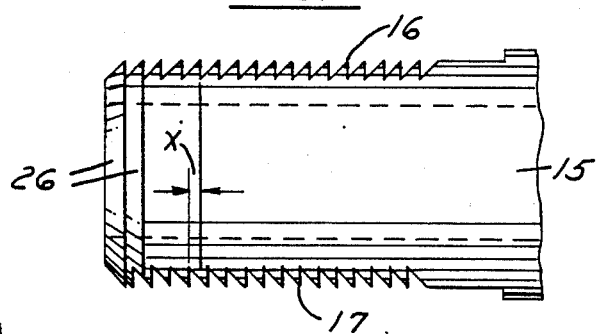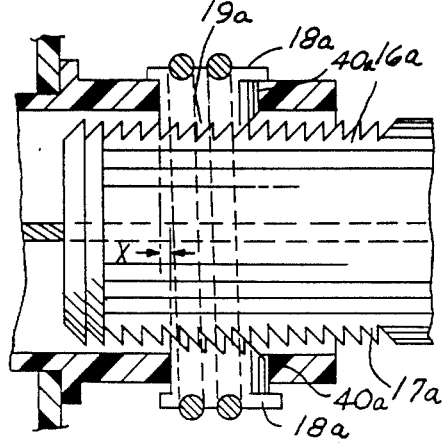

CONTROL CABLE CONDUIT LENGTH ADJUSTMENT DEVICE

This application is a continuation of application Ser. No. 829,762, filed Feb. 14, 1986, abandoned.

This invention relates to adjustment of control cables for devices which require automatic variable adjustment of the cable length.

BACKGROUND AND SUMMARY OF THE INVENTION

In various devices such as automobile controls for automatic transmissions, parking brakes, clutches, cruise control devices and shifter devices, it is common to provide a control cable operating within a conduit. Correct adjustment of such devices is important and it is desirable to utilize automatic ratcheting devices in certain applications.

In U.S. Pat. No. 3,662,617 there is shown an automatic device which comprises an arrangement wherein two members have interengaging ratcheting teeth, the teeth on the one member being yieldingly urged toward the teeth of the other member by forming the one member with a yieldable body portion. In U.S. Pat. No. 3,710,645 an independently biased latch is provided with teeth for engaging the teeth on the one member.

Among the objectives of the present invention are to provide an improved control cable conduit length adjustment device which will automatically provide for adjustment in finer increments; which utilizes a simple arrangement for resetting; which can readily provide varying adjustment of the force of ratcheting; which includes means for preventing inadvertent disassembly; which can be readily protected by a covering such as a boot; which can be used in either tension or compression cable arrangements; and which is easy to assemble.

In accordance with the invention a control cable conduit length adjustment device comprising an outer detent member connected to a conduit, an inner adjuster member extending into the detent member, the adjuster member having opposed sets of ratcheting teeth and the detent member having opposed detent pawls with teeth engaging the teeth on the adjuster member. The teeth on the adjuster member are offset longitudinally so that a smaller increment of adjustment is provided. A control cable extends through the conduit and the detent and adjuster members. Resetting of the device is achieved by rotating the detent member relative to the adjuster member to disengage the teeth on the pawls and adjuster member so that the members can be moved longitudinally relative to one another.

DESCRIPTION OF THE DRAWINGS

FIG. 1 is a part sectional longitudinal view of a cable control system embodying the invention.

FIG. 2 is a part sectional view of a cable control system embodying the invention on an enlarged scale taken along the line 2—2 in FIG. 1.

FIG. 3 is a sectional view taken along the line 3—3 in FIG. 2.

FIG. 4 is a sectional view taken along the line 4—4 in FIG. 2.

FIG. 5 is a view similar to FIG. 4 showing the relative position of the parts during resetting.

FIG. 6 is a plan view of a pawl utilized in the device.

FIG. 7 is an elevational view of the pawl shown in FIG. 6.

FIG. 8 is a fragmentary view on an enlarged scale of the teeth of the pawl.

FIG. 9 is a fragmentary view of one of the members of the device.

FIG. 10 is a fragmentary view of a modified form of adjustment device.

DESCRIPTION

Referring to FIG. 1, a control cable system embodying the invention comprises a conduit 10 which is attached at one end to a body 11 for attachment as by a tab 12 to a fixed point on the vehicle. The system further includes a cable 13 that extends through the conduit 10. A first detent member 14 is attached to the other end of the conduit 10 and comprises a plastic tubular body into which an inner adjuster member 15 that is generally cylindrical extends. Member 15 is provided with opposed sets 16, 17 of longitudinally spaced ratcheting teeth which are engaged by opposing pawls 18 having opposed teeth 19. As shown in FIG. 2, teeth 16, 20, are shaped so that they are unsymmetrical in cross section so that a one-way ratcheting action is permitted of the adjuster member 15 axially relative to the detent member 14 to the left as viewed in FIG. 2. The pawls 18 are mounted in opposed radial openings 40 in the first detent number 14 and are yieldingly urged radially inwardly by arcuate springs 20 that are generally C shaped and engage grooves 21, 22 in each pawl 18 (FIGS. 6, 7). The pawls 18 include peripheral tabs 18A for facilitating positioning and preventing the pawls 18 from moving radially inwardly before assembly. The springs are maintained in position to maintain the desired spring 20 force by a radial projection 23 on member 14 that functions to prevent rotation of the springs 20. The projection 23 is positioned circumferentially an equal distance from pawls 18 such that the C-shaped springs 20 maintain an equal force on the pawls 18. The inner member 15 has opposed arcuate smooth surfaces 24, 25 such that when the outer member 14 and inner member 15 are rotated, the teeth are disengaged permitting relative longitudinal movement of the outer and inner members 14, 15 to reset any adjustment.

Referring to FIG. 9, the teeth 16 on the inner member 15 are spaced longitudinally relative to the teeth 17 by an increment X so that in any ratcheting action, an increment of adjustment is possible which is a fraction of the length of a tooth, as contrasted to a whole tooth as would be the case if teeth 16, 17 were aligned.

Alternatively, as shown in FIG. 10, the pawls 18a can be positioned longitudinally relative to one another by a similar increment while maintaining the teeth 16a, 17a longitudinally aligned.

The teeth on at least one of the members have flattened ends (FIG. 3) to control and minimize the ratcheting force and thus facilitate the ratcheting system.

The teeth 26 at the end of the inner member 15 are preferably a complete annulus and thereby serve as stops to prevent disengagement axially of the inner and outer member inadvertently in either the ratcheting position or the resetting position.

A boot 27 is provided over the pawls and the ratcheting teeth as a protective covering.

In a typical arrangement of an automatic transmission, the cable system embodying the invention could be used to control the transmission as follows:

A. The accelerator pedal is depressed.

B. A cable 13 pulls the throttle plate lever.

C. The throttle valve lever is mechanically connected to the throttle plate lever.

D. The throttle valve lever pulls on the cable 13 which moves the throttle valve.

E. When the accelerator pedal is fully depressed, the throttle is wide open (commonly described as W.O.T. position).

F. At W.O.T., the throttle valve should be just touching the mechanical (internal) valve stop.
  (1) Usually, the length of the cable is set so that the stop is touched before W.O.T. can be achieved by the throttle valve.
  (2) If this happens, if no adjustment were provided, the W.O.T. position of the throttle valve could not be attained.
  (3) If the conduit length culd be shortened, it would create the effect of lengthening the cable.
  (4) By providing the automatic shortening of the conduit, the throttle cable is allowed to continue its motion until the W.O.T. position stop is reached in the throttle body.
  (5) At the W.O.T. position in the throttle body thus achieved, both conditions are met, i.e.
    (a) The W.O.T. position is achieved.
    (b) The throttle valve is against the internal stop.

G. The automatic shortening described above is achieved as follows:
  (1) When the throttle valve touches the internal stop, a resistance tensile force is established in the cable.
  (2) An equal reaction compressive force is set up in the conduit (action=reaction).
  (3) The conduit 10 pushes against the outer detent body 14.
  (4) The outer detent body 14 pushes against the adjuster pawls 18 which are spring-loaded against the inner adjuster body 15.
  (5) The friction caused by the spring force on the adjuster pawls 18 against the inner adjuster body 15 acts to cause a preset adjustment load.
  (6) At the preset load, the teeth on the adjuster pawls 18 begin to slide relative to the teeth on the inner adjuster body 15.
  (7) The teeth continue to slide, and ratchet, until the maximum stroke is attained.
  (8) The teeth on the inner adjuster body are in two (or more) sets. The sets are offset by ½ (or fewer) teeth, so as to reduce the increment of adjustment. The adjuster pawl teeth lock against the mating teeth on the inner adjuster body.

H. Resetting the device is achieved by twisting the outer detent body 14 relative to the inner adjuster body 15, and pulling the two apart as far as they will go. Internal stops 26 prevent total separation of the two parts 14 and 15.

Resetting may be needed if the engine or transmission is removed from the vehicle, or for other component service.

Among the features of the control cable conduit length adjustment devices are:

1. A motion transmitting cable device with an automatic self adjustment feature on the conduit.

2. An adjustment increment which is ½ (or less) of the tooth spacing. This provides finer adjustment.

3. A simple reset feature. Twist-and-pull.

4. Easily replaceable spring(s) for varying the adjustment force levels.

5. The spring forces of the C-springs can be readily changed by changing the diameter or thickness.

6. Various end configurations so that the device can be mounted on fixtures at either end of the conduit.

7. Inadvertent disassembly protection by a circumferential tooth (or set of teeth) at the end of the inner adjuster body.

8. Simple construction which can be covered with a simple protective covering (a boot) to protect the mechanism from contamination.

9. May be used with either tension or compression cable arrangements.

10. Although the application for a throttle was described, similar designs may be employed for other applications including (but not limited to):
  (a) Parking brakes;
  (b) Clutch:
  (c) Cruise control;
  (d) Shifter cables.

We claim:

1. A self-adjusting control cable conduit length adjustment device comprising
  a tubular outer detent member defining an opening,
  an inner adjuster member extending into said opening of said detent member and guided thereby for longitudinal movement,
  a conduit connected to one end of said detent member, and
  a control cable extending through the detent and adjuster member,
  said adjuster member having opposed sets of longitudinally spaced ratcheting teeth,
  said detent member having opposed radial openings,
  a set of opposed detent pawls mounted in said openings,
  said openings guiding said pawls for radial movement only with respect to said outer detent member,
  each pawl having an outer radial end and an inner radial end,
  a plurality of teeth on the inner end of each pawl complementary to and engaging a respective set of teeth on the adjuster member,
  said teeth on said detent member and said adjuster member being unsymmetrical in cross section so that a one-way ratcheting action is permitted of the adjuster member axially inwardly relative to the detent member,
  spring means engaging the outer ends of said pawls exteriorly of the detent member and yieldingly urging said pawls radially inwardly,
  such that when a predetermined force is applied on the inner adjuster member tending to force the adjuster member axially inwardly relative to the detent member, the pawls are caused to move radially outwardly and ratchet automatically so that the force moves the adjuster member axially inwardly relative to the detent member thereby shortening the effective length of the conduit, thus lengthening the inner member,
  said spring means yieldingly urging said pawls radially inwardly comprising at least one circumferentially extending arcuate spring surrounding the detent member and engaging the radially outer ends of said pawls,
  said spring being C-shaped with ends positioned circumferentially between said pawls, said detent member having means thereon for preventing said spring from rotating such that the engagement with the pawls is maintained and that substantially equal spring force is applied to each said pawl, said means on said detent member comprising a radial projection extending between the ends of said spring.

2. A self-adjusting control cable conduit length adjustment device comprising a tubular outer detent member defining an opening, an inner adjuster member extending into said opening of said detent member and guided thereby for longitudinal movement, a conduit connected to one end of said detent member, and a control cable extending through the detent and adjuster member, said adjuster member having opposed sets of longitudinally spaced ratcheting teeth, said detent member having opposed radial openings, a set of opposed detent pawls mounted in said openings, said openings guiding said pawls for radial movement only with respect to said outer detent member, each pawl having an outer radial end and an inner radial end, a plurality of teeth on the inner end of each pawl complementary to and engaging a respective set of teeth on the adjuster member, said teeth on said detent member and said adjuster member being unsymmetrical in cross section so that a one-way ratcheting action is permitted of the adjuster member axially inwardly relative to the detent member, spring means engaging the outer ends of said pawls exteriorly of the detent member and yieldingly urging said pawls radially inwardly, such that when a predetermined force is applied on the inner adjuster member tending to force the adjuster member axially inwardly relative to the detent member, the pawls are caused to move radially outwardly and ratchet automatically so that the force moves the adjuster member axially inwardly relative to the detent member thereby shortening the effective length of the conduit and lengthening the effective length of the inner member, said adjuster member being rotatable relative to said detent member, circumferential portions of said adjuster member circumferentially between said sets of ratcheting teeth are smooth such that resetting of the device may be achieved by manually rotating the detent member relative to the adjuster member to cause the pawls to be moved radially outwardly and thereby disengage the teeth on the pawls from the teeth on the adjuster member and cause the teeth on the pawls to contact said smooth circumferential portions so that the detent and adjuster member can be moved longitudinally relative to one another after which the detent member and adjuster member may be rotated relative to one another to re-engage the teeth of the pawls and adjuster member, said adjustment member including radial tooth portions aligned circumferentially with said smooth portions for engaging said pawls to prevent inadvertent disassembly of the device when the adjustment member is moved axially outwardly relative to said detent member.

3. A self-adjusting control cable conduit length adjustment device comprising a tubular outer detent member defining an opening, an inner adjuster member extending into said opening of said detent member and guided thereby for longitudinal movement, a conduit connected to one end of said detent member, and a control cable extending through the detent and adjuster member, said adjuster member having opposed sets of longitudinally spaced ratcheting teeth, said detent member having opposed radial openings, a set of opposed detent pawls mounted in said openings, said openings guiding said pawls for radial movement only with respect to said outer detent member, each pawl having an outer radial end and an inner radial end, a plurality of teeth on the inner end of each pawl complementary to and engaging a respective set of teeth on the adjuster member, said teeth on said detent member and said adjuster member being unsymmetrical in cross section so that a one-way ratcheting action is permitted of the adjuster member axially inwardly relative to the detent member, at least one circumferentially extending arcuate C-shaped spring having spaced ends surrounding the detent member and engaging the outer ends of said pawls exteriorly of the detent member and yieldingly urging said pawls radially inwardly into engagement with the respective set of teeth on the adjuster member, means between said C-shaped spring and said detent member for preventing rotation of said C-shaped spring relative to said detent member such that engagement is maintained between the spring and the pawls and substantially equal spring force is applied to each said pawl, such that when a predetermined force is applied on the inner adjuster member tending to force the adjuster member axially inwardly relative to the detent member, the pawls are caused to move radially outwardly and ratchet automatically so that the force moves the adjuster member axially inwardly relative to the detent member thereby shortening the effective length of the conduit and lengthening the effective length of the inner member.

4. The adjustment device set forth in claim 3 wherein each said pawl has a transverse groove in which said C-shaped spring is positioned.

5. The adjustment device set forth in claim 3 wherein each said pawl includes a tab limiting inward movement of the pawl during assembly.

6. The adjustment device set forth in claim 3 including a second C-shaped spring and a second groove in each pawl engaged by said second spring.

* * * * *